(12) United States Patent
Banavali et al.

(10) Patent No.: US 7,550,614 B2
(45) Date of Patent: Jun. 23, 2009

(54) METHOD FOR ESTERIFICATION OF FREE FATTY ACIDS IN TRIGLYCERIDES

(75) Inventors: Rajiv Manohar Banavali, Rydal, PA (US); Gregory C. Pierce, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/975,402

(22) Filed: Oct. 19, 2007

(65) Prior Publication Data

US 2008/0114181 A1 May 15, 2008

Related U.S. Application Data

(60) Provisional application No. 60/858,583, filed on Nov. 13, 2006.

(51) Int. Cl.
*C11B 3/04* (2006.01)
(52) U.S. Cl. ........................ 554/174; 554/169
(58) Field of Classification Search ................. 554/142, 554/169, 170, 174, 194
See application file for complete search history.

(56) References Cited

U.S. PATENT DOCUMENTS

| | | | | |
|---|---|---|---|---|
| 3,252,921 | A | * 5/1966 | Hansen et al | 521/28 |
| 3,590,073 | A | 6/1971 | Carr et al. | |
| 4,528,395 | A | 7/1985 | Beidler et al. | |
| 4,698,186 | A | * 10/1987 | Jeromin et al. | 554/174 |
| 5,395,857 | A | 3/1995 | Berg et al. | |
| 5,426,199 | A | * 6/1995 | Lundquist | 544/169 |
| 5,578,090 | A | 11/1996 | Bradin | |
| 2005/0274065 | A1 | 12/2005 | Portnoff et al. | |
| 2008/0015375 | A1 | 1/2008 | Banavali et al. | |

FOREIGN PATENT DOCUMENTS

| | | | |
|---|---|---|---|
| EP | 139919 | | 5/1985 |
| FR | 2577938 | * | 8/1986 |
| WO | WO 2006/064643 | | 6/2006 |

OTHER PUBLICATIONS

Rios, et al., "Resin catalyzed alcoholysis of epoxidized fatty esters: Effect of the alcohol and the resin structures", Applied Catalysis, vol. 284, No. 1-2, pp. 155-161 (2005).
Guerreiro, et al., "Transesterification of soybean oil over sulfonic acid functionalised polymeric membranes", Catalysis Today, vol. 118, pp. 166-171 (2006).
Marchetti, et al., "Heterogeneous esterification of oil with high amount of free fatty acids", Fuel, IPC Science and Technology Press, vol. 86, No. 5-6, pp. 906-910 (2006).
Schuchardt, etal., "Tranesterification of soybean oil catalysed by alkylguanidines heterogenized on different substituted . . . " J.Molecular Catalysis, vol. 109, pp. 37-44 (1996).
Jerabek, et al., "Polymer Matrix Influenence on Ion Exchange Resin-Catalyzed Reactions", J.Molecular Catalysis, vol. 39, No. 2, pp. 161-167 (1987).

* cited by examiner

*Primary Examiner*—Jafar Parsa
*Assistant Examiner*—Yate' K Cutliff
(74) *Attorney, Agent, or Firm*—Kenneth Crimaldi

(57) ABSTRACT

A method for esterification of free fatty acids in triglycerides, with $C_1$-$C_8$ aliphatic alcohols. The method uses an acidic ion exchange resin as a catalyst. The catalyst is contacted with a reaction mixture containing a triglyceride having at least 1% free fatty acids and a $C_1$-$C_8$ aliphatic alcohol under conditions suitable for esterification.

13 Claims, No Drawings

METHOD FOR ESTERIFICATION OF FREE FATTY ACIDS IN TRIGLYCERIDES

This application claims the benefit of priority under 35 U.S.C. §119(e) of U.S. Provisional Patent Application No. 60/858,583 filed on Nov. 13, 2006.

BACKGROUND

This invention relates generally to a method for esterification of free fatty acids in triglycerides with alcohols to produce fatty acid alkyl esters.

High fuel prices and environmental concerns are driving development of alternative fuels, especially those derived from renewable resources. One such fuel, commonly known as "biodiesel" fuel, contains methyl esters of fatty acids, and is burned in diesel engines. Biodiesel fuel is produced from transesterification of triglycerides, such as vegetable oils with alcohols, typically with methanol. However, small amounts of free fatty acids present in triglycerides cause problems in the transesterification process, including foaming in the reaction mixture. The prior art discloses methods for esterification of these free fatty acids, e.g., in WO 2006/064643. However, the prior art teaches that resins with a high crosslinker level are needed to catalyze esterification of free fatty acids in triglycerides.

The problem addressed by this invention is to find an improved method for esterification of free fatty acids in triglycerides.

STATEMENT OF INVENTION

The present invention is directed to a method for esterification of free fatty acids in triglycerides with $C_1$-$C_8$ aliphatic alcohols or diols; said method comprising steps of: (a) providing a catalyst comprising a gel-type acidic ion exchange resin having 0.25% to 2.75% crosslinker; and (b) contacting said catalyst with a reaction mixture comprising: (i) a triglyceride having at least 1% free fatty acids; and (ii) a $C_1$-$C_8$ aliphatic alcohol or diol, under conditions suitable for esterification.

DETAILED DESCRIPTION

All percentages are weight percentages, and all temperatures are in ° C., unless otherwise indicated. Weight percentages of ion exchange resin are based on dry resin. An "alkyl" group is a saturated hydrocarbyl group having from one to twenty carbon atoms in a linear, branched or cyclic arrangement. In one preferred embodiment, alkyl groups are acyclic. "Triglycerides" used in this invention are fats or oils comprising glycerine triesters of fatty acids. Preferably, triglycerides are in the form of vegetable oils, but animal fats can also be used as a starting material. Fatty acids are acyclic aliphatic carboxylic acids containing from 8 to 20 carbon atoms; typically, they contain from 12 to 18 carbon atoms. With respect to carbon-carbon bonds, the fatty acids may be saturated, monounsaturated or polyunsaturated (typically 2 or 3 carbon-carbon double bonds). Natural fats may also contain small amounts of other esterified, or free fatty acids, as well as small amounts (1-4%) of phospholipids, e.g., lecithin, and very small amounts (<1%) of other compounds, e.g., tocopherols.

In one embodiment of the invention, the reaction mixture is heated in a temperature range from 40° C. to 150° C. for at least 15 minutes in contact with the catalyst. Alternatively, the temperature is at least 50° C., alternatively at least 55° C., alternatively at least 60° C. Alternatively, the temperature is no greater than 110° C., alternatively no greater than 90° C., alternatively no greater than 85° C., alternatively no greater than 80° C., alternatively no greater than 75° C. When the reaction is carried out in a batch reactor, preferably the reaction time is at least 0.5 hour, alternatively at least 1 hour, alternatively at least 2 hours, alternatively at least 3 hours, alternatively at least 6 hours. Alternatively, the reaction time is no greater than 24 hours, alternatively no greater than 16 hours, alternatively no greater than 10 hours, alternatively no greater than 6 hours. In an embodiment where the temperature is from 55-75° C., the reaction time is from 0.5-6 hours. The catalyst is removed from the reaction mixture by filtration, centrifugation, or any other standard method for separating solids and liquids. When the reaction is carried out in a continuous reactor, preferably the contact time is at least 30 minutes, alternatively at least 45 minutes. Preferably, the contact time is no more than 6 hours, alternatively no more than 4 hours, alternatively no more than 2 hours.

In one embodiment of the invention, the triglyceride contains from 1% to 99% free (unesterified) fatty acids, alternatively up to 80%, alternatively up to 50%, alternatively up to 40%, alternatively up to 30%, alternatively up to 20%, alternatively up to 10%. In one embodiment, the triglyceride contains at least 1% free fatty acids, alternatively at least 2%, alternatively at least 3%, alternatively at least 5%. In one embodiment of the invention, the triglyceride contains from 2% to 40% free fatty acids.

In one embodiment of the invention, the $C_1$-$C_8$ aliphatic alcohol or diol is a $C_1$-$C_4$ alcohol; alternatively it is methanol, ethanol or n-butanol; alternatively it is methanol or ethanol; and most preferably methanol. In one embodiment of the invention, the $C_1$-$C_8$ aliphatic alcohol or diol is a $C_1$-$C_8$ diol, alternatively a $C_1$-$C_4$ diol, e.g., ethylene glycol. In one embodiment of the invention, the alcohol is present in an amount of at least 1.1 equivalents based on free fatty acid, alternatively at least 2 equivalents, alternatively at least 5 equivalents, alternatively at least 10 equivalents, alternatively at least 15 equivalents. In one embodiment of the invention, the alcohol is present in an amount of no more than 25 equivalents.

The ion exchange resin used in the present invention is a gel-type resin, not a macroreticular resin. A macroreticular resin is a resin having a surface area from 25 m$^2$/g to 200 m$^2$/g and an average pore diameter from 50 Å to 500 Å; alternatively a surface area from 30 m$^2$/g to 80 m$^2$/g and an average pore diameter from 100 Å to 300 Å. Suitable gel-type resins include, e.g., acrylic resins, styrenic resins, and combinations thereof. Resins contain polymerized units of a multiethylenically unsaturated monomer (crosslinker). Preferably, the level of crosslinker in the resin is no more than 2.5%, alternatively no more than 2.25%, alternatively no more than 2%, alternatively no more than 1.75%. In one embodiment, the level of crosslinker is at least 0.5%, alternatively at least 0.75%, alternatively at least 1%. Preferably, the average particle size of the gel resin is from 100 μm to 2000 μm, more preferably from 200 μm to 800 μm. In one embodiment of the invention, the ion exchange resin comprises polymerized units of styrene and a crosslinker, e.g., divinyl aromatics; di-, tri- and tetra-(meth)acrylates or (meth)acrylamides; di-, tri- and tetra-allyl ethers and esters; polyallyl and polyvinyl ethers of glycols and polyols. In one embodiment of the invention, the crosslinker is diethylenically unsaturated, e.g., divinylbenzene (DVB). In one embodiment of the invention, the acid functionality of the ion exchange resin comprises sulfonic acid groups, carboxylic acid groups, phosphoric acid groups or a mixture thereof. A typical acidic ion exchange resin has from 0.4 to 8 meq/g acid functionality, on a dry basis, alternatively at least 2 meq/g, alternatively at least 4 meq/g. Preferably, the acid functionality is in the form of sulfonic acid groups. In one embodiment of the invention, when the reaction is carried out in a batch reactor, the resin is present in an amount from 0.1% to 20% (based on dry weight of resin) of the reaction mixture, alternatively from 1% to 15%, alternatively from 2% to 8%. The reaction also may be carried out in a continuous reactor in which the catalyst is confined to the reactor, e.g., in a catalyst bed.

EXAMPLES

The data for esterification reaction is based on the percent conversion of free fatty acid (FFA) to the methyl ester. The FFA used in these Examples is reagent grade stearic acid, spiked into vegetable oil (food-grade canola oil having <0.1% total acids), with a fixed amount of solid phase catalyst, refluxed in methanol for 2, 4 or 6 hours. Standard conditions are 8.2% stearic acid (22.5 g), 73.6% oil (202.5 g), 18.2% methanol (50 g), and 5% dry resin (13.75 g). The specific reaction conditions are detailed in Example 1. The procedure outlined in Example 1 remained constant throughout the esterification study. Variations in catalyst type, catalyst amount, and amount of FFA, were all conducted under the same experimental conditions as outlined in Example 1. All subsequent reactions using commercially available oils, such as, chicken oil from Europe and palm oil from Malaysia, were conducted under the same conditions as Example 1. The esterification of FFA that was separated from waste glycerol was conducted under the same conditions listed in Example 1.

Example 1

Esterification of Stearic Acid in Vegetable Oil

In a four-neck 1 L RB flask equipped with a Soxhlet condenser containing 50 g activated molecular sieves 3A, thermometer and mechanical stirrer, was added methanol rinsed ion exchange resin catalyst beads (13.75 g, 5% by weight of reaction mixture). Canola oil (202.5 g, 0.23 moles triglycerides) was charged to the flask and mechanical stirring started at 185 RPM. Then, stearic acid (22.5 g; 0.079 moles, 8.2% of oil) was added and the flask was heated by external infrared lamp to reach 60° C. over 20 minutes. At 60° C., methanol (50 g, 1.56 mole or 20 equivalents based on FFA) was charged to the flask. The mixture was allowed to reach reflux temperature (~65-67° C.) with efficient stirring (235 rpm). The reflux was condensed through a water condenser and passed through the molecular sieves back into the flask.

The reaction was carried out at 65° C.-67° C. (reflux temperature) and atmospheric pressure for 6 hours. Samples were taken at 30 minute intervals, using a long stem polyethylene pipette with small bore to avoid withdrawing catalyst beads. Samples were filtered through 0.45 um MILLIPORE PTFE filter into a tared one ounce glass vial. Sample weight was recorded. Samples separated into two phases, a methanolic phase on top containing a mixture of methyl esters of fatty acid and a bottom phase of mainly unreacted stearic acid and canola oil. After 6 hours, the mixture was cooled to ambient temperature. The catalyst was recovered by filtration from the organic phase. A final sample of the liquid phase was taken for analysis and the remaining oil, methanol, stearic acid mixture was discarded.

Examples 2 through 36 are the same as Example 1 except for variations in catalyst type and amount, type of oils, type and amount of FFA, as mentioned in the tables.

GC Method:

GC/MS analysis of the reaction mixture was conducted to analyze for methyl stearate. The analysis showed 100% conversion in 120 minutes for a gel resin having 2% DVB content.

The reaction mixture samples were diluted to 1% with THF. The dilute samples were injected into an HP 5890 Series II GC with an HP 5972 MS Detector. The GC column was SUPELCO EQUITY 1, 30 m×0.25 mm, with 0.25 um film thickness. The injector was 1 µl, split 22:1, with an injection temperature of 250° C. The carrier gas was helium, with linear velocity 32 cm/s @ 210° C. in a constant flow mode. The oven temperature was held at 210° C. for 8 minutes, with a ramp of 15° C./min up to 320° C. for a 5 minute hold.

GC/MS analysis of the starting canola oil and reaction mixture was conducted to analyze for esters. Analysis indicated the presence of a mixture of methyl esters of fatty acids {typical biodiesel mixture (methyl esters of palmitic, stearic, linoleic and linolenic acids, etc)} and the presence of stearic acid. The analysis also revealed the presence of glycerol.

The Tables display percent yields of methyl stearate, except for Table 2, which displays percent of initial stearic acid remaining.

TABLE 1

Screening of Strong Acid Catalysts for Esterification

| Example | Catalyst[1] | HMS (mm) | wt cap (meq/g) | vol cap (eq/L) | 2 hr | 4 hr | 6 hr |
|---|---|---|---|---|---|---|---|
| 0 | control | NA | NA | NA | 0% | 0% | 0% |
| 1 | Gel-2% DVB | 0.75 | 5.13 | 1.17 | 100% | | |
| 2 | Gel-0.5% DVB | 0.75 | 5.15 | 1.18 | 100% | | |
| 3 | Gel-1% DVB | 0.75 | 5.94 | 1.2 | 100% | | |
| 4 | Gel-2.5% DVB | 0.75 | 4.7 | 0.85 | 100% | | |
| 5 | Gel-1.5% DVB | 0.75 | 5.5 | 1.18 | 100% | | |
| 6 | Gel-4% DVB | 0.75 | 5.6 | 1.54 | 37% | 54% | 67% |
| 7 | Gel-4.5% DVB | 0.75 | 4.8 | 1.35 | 64% | 81% | 94% |
| 8 | MR-7% DVB | 0.6 | 2.7 | 0.95 | 90% | | |
| 9 | MR-12% DVB | 0.68 | 3.1 | 1.17 | 75% | | |
| 10 | MR-12% DVB | 0.67 | 3.21 | 1.03 | 55% | 80% | 98% |
| 11 | MR-18.5% DVB | 0.77 | 4.8 | 0.8 | 49% | 80% | 95% |
| 12 | MR-18.5% DVB | | | | | | 74% |
| 13 | MR-12% DVB | | | | | | 70% |
| 14 | MR-80% DVB | | 3.2 | | | | 67% |
| 15 | MR-18.5% DVB | 0.82 | 5.2 | 1.9 | | | 58% |

TABLE 1-continued

Screening of Strong Acid Catalysts for Esterification

| Example | Catalyst[1] | HMS (mm) | wt cap (meq/g) | vol cap (eq/L) | 2 hr | 4 hr | 6 hr |
|---|---|---|---|---|---|---|---|
| 16 | MR-12% DVB | 0.72 | 5.4 | | | | 55% |
| 17 | MR-12% DVB | 0.7 | 4.8 | 1.7 | | | 54% |
| 18 | MR-18.5% DVB | | 4.7 | | | | 46% |
| 19 | 96% $H_2SO_4$ | NA | NA | NA | | 87% | |

[1] MR = macroreticular

Catalysts had the following properties: all were styrenic resins having sulfonic acid groups. The harmonic mean size of the resin beads (HMS) and the weight capacity (wt cap) and volume capacity (vol cap) are listed in Table 1.

TABLE 2

Disappearance of Free Fatty Acid in Esterification Reaction

| Example | Resin | FFA/Oil | 0 | 30 min | 1 hr | 2 hr | 4 hr |
|---|---|---|---|---|---|---|---|
| 20 | Gel-2% DVB | stearic/canola | 8.2% | 3.2% | 1.5% | 0.4% | 0% |
| 21 | Gel-2.5% DVB | stearic/canola | 8.2% | | | 1.3% | 0.1% |
| 22 | Gel-2% DVB | natural[1]/chicken | 1.3% | | 0.1% | | 0% |
| 23 | Gel-2% DVB | Control | 0% | | | | 0% |

[1] Chicken oil with the naturally occurring level of FFA.

TABLE 3

Esterification of Commercial Oils: Chicken Oil, Palm Oil

| Example | Catalyst | Oil | 2 hr | 4 hr | 6 hr |
|---|---|---|---|---|---|
| 24 | Gel-2% DVB | Palm | 82% | 88% | 99% |
| 25 | Gel-2% DVB | Chicken | 100% | | |
| 26 | MR-12% DVB | Chicken | 92% | | |

Above oils with naturally occurring FFA only (palm - 4%, chicken - 2%)

TABLE 4

Resin Recycle - 2 Hr Cycle Time - % Conversion of FFA

| EX. | Resin | Oil | 1 | 2 | 3 | 4 | 5 | 6 | 8 | 10 |
|---|---|---|---|---|---|---|---|---|---|---|
| 27 | Gel-2% DVB | Canola | 100 | 100 | 100 | 100 | 100 | 100 | 100 | 100 |
| 28 | MR-7% DVB | Canola | 90 | 84 | | 83 | | | | |
| 29 | MR-18.5% DVB | Canola | 46 | 34 | | | | 23 | | 19 |
| 30 | MR-12% DVB | Canola | 75 | 20 | | 10 | | 5 | | 2 |
| 31 | Gel-2% DVB | Palm | 76 | 73 | 81 | 81 | 82 | | | |
| 32 | Gel-2% DVB | Chicken | 100 | 97 | 99 | 84 | 81 | | | |

TABLE 4A

Resin Recycle - Properties of fresh catalyst versus 10th recycle

| Example | Type | WB | PB | % SOL | Wt-Cap | Vol-Cap |
|---|---|---|---|---|---|---|
| 27-C10 | >10 cycles | 100 | 99 | 19.4 | 5.08 | 0.65 |
| | Fresh | 100 | 98 | 20.0 | 5.13 | 0.71 |

TABLE 5

Reaction Kinetics

| EX. | Resin | 15 min | 30 min | 45 min | 60 min | 90 min | 120 min |
|---|---|---|---|---|---|---|---|
| 33 | MR-7% DVB | | 46% | | 78% | 84% | 87% |
| 34 | MR-12% DVB | | 29% | | 43% | 73% | 83% |
| 35 | Gel-2% DVB | 57% | 70% | 86% | 100% | | 100% |
| 36 | Gel-2.5% DVB | 41% | 63% | 80% | 85% | | 100% |

The results from these experiments show that the gel phase, low-DVB (less than 3%) strong sulfonic acid resins catalyze the reaction of FFA to the methyl ester in a very facile, quantitative, and selective way and meet all the requirements; fast kinetics, total conversion, and resin recycle. A lightly (2%) cross-linked, gel cation resin had fast reaction kinetics (conversion in less than 1 hour), complete conversion (100%), and good resin recycle (no degradation in activity even after 10 cycles). The studies with the commercial oils also look promising, both in terms of fast kinetics and complete reactions.

Good selectivity for esterification was demonstrated by analyzing for dimethyl ether byproduct, which was not detected, and by the mass balance accounting for essentially all of the stearic acid.

The invention claimed is:

1. A method for esterification of free fatty acids in triglycerides with $C_1$-$C_4$ aliphatic alcohols; said method comprising steps of:
   (a) providing a catalyst comprising a gel-type acidic ion exchange resin having 0.5% to 2.5% crosslinker and sulfonic acid functionality and which comprises polymerized units of styrene and a crosslinker; and
   (b) contacting said catalyst with a reaction mixture comprising: (i) a triglyceride having at least 1% free fatty acids; and (ii) a $C_1$-$C_4$ aliphatic alcohol in a temperature range from 40° C. to 110° C.

2. The method of claim 1 in which the $C_1$-$C_4$ aliphatic alcohol is selected from the group consisting of methanol and ethanol and the alcohol is present in an amount of at least 2 equivalents based on free fatty acid.

3. The method of claim 2 in which the resin has 1% to 2.5% crosslinker.

4. The method of claim 3 in which the triglyceride has 1% to 80% free fatty acids.

5. The method of claim 4 in which the resin has an average particle size from 100 μm to 2000 μm.

6. The method of claim 5 in which the reaction mixture is heated in a batch reactor in a temperature range from 40° C. to 90° C. for at least 0.5 hours.

7. The method of claim 5 in which the reaction mixture is in contact with catalyst in a continuous reactor in a temperature range from 40° C. to 90° C. for at least 15 minutes.

8. The method of claim 3 in which the triglyceride has 1% to 20% free fatty acids.

9. The method of claim 8 in which the aliphatic alcohol is methanol.

10. The method of claim 9 in which the reaction mixture is heated in a batch reactor in a temperature range from 40° C. to 90° C. for at least 0.5 hours.

11. The method of claim 9 in which the reaction mixture is heated in a continuous reactor in a temperature range from 40° C. to 90° C. and the reaction mixture is in contact with the catalyst for at least 0.5 hours.

12. The method of claim 3 in which the triglyceride has from 2% to 10% free fatty acids.

13. The method of claim 12 in which the aliphatic alcohol is methanol.

* * * * *